(12) United States Patent
Neutzler et al.

(10) Patent No.: US 8,836,848 B2
(45) Date of Patent: Sep. 16, 2014

(54) VISION SYSTEM

(75) Inventors: Jay K. Neutzler, Houston, TX (US);
Roger R. Lopez, LaVernia, TX (US)

(73) Assignee: Southwest Research Institute, San Antonio, TX (US)

( * ) Notice: Subject to any disclaimer, the term of this patent is extended or adjusted under 35 U.S.C. 154(b) by 517 days.

(21) Appl. No.: 12/693,669

(22) Filed: Jan. 26, 2010

(65) Prior Publication Data

US 2011/0181767 A1    Jul. 28, 2011

(51) Int. Cl.
*H04N 5/232* (2006.01)
*H04N 5/225* (2006.01)

(52) U.S. Cl.
CPC .................................... *H04N 5/2254* (2013.01)
USPC .......................................... 348/345; 348/340

(58) Field of Classification Search
USPC .......... 345/340, 343, 345; 348/340, 345, 343, 348/47, 48, 51, 159, 157, 153, 169, 202, 348/207.99, 344
See application file for complete search history.

(56) References Cited

U.S. PATENT DOCUMENTS

| | | |
|---|---|---|
| 4,624,563 A | 11/1986 | Johnson |
| 5,134,680 A | 7/1992 | Schempp |
| 5,429,635 A | 7/1995 | Purcell, Jr. et al. |
| 5,892,867 A | 4/1999 | Riser et al. |
| 6,086,234 A | 7/2000 | Riser et al. |
| 6,292,608 B1 * | 9/2001 | Toh .................................. 385/43 |
| 6,473,238 B1 | 10/2002 | Daniell |
| 6,501,543 B2 | 12/2002 | Hedges et al. |
| 6,678,098 B2 | 1/2004 | Amery et al. |
| 6,847,865 B2 | 1/2005 | Carroll |
| 6,999,110 B2 | 2/2006 | Kobayashi |
| 7,059,778 B2 | 6/2006 | Suzuki et al. |
| 7,110,092 B2 | 9/2006 | Kasper et al. |
| 7,171,088 B2 * | 1/2007 | Koyama et al. ............... 385/116 |
| 7,228,232 B2 | 6/2007 | Bodin et al. |
| 7,277,053 B2 | 10/2007 | Riel et al. |
| 7,347,555 B2 | 3/2008 | Grover |
| 7,375,312 B2 | 5/2008 | Butterworth |
| 7,429,997 B2 | 9/2008 | Givon |
| 7,518,099 B2 | 4/2009 | Pallaro et al. |
| 7,546,187 B2 | 6/2009 | Bodin et al. |
| 7,593,794 B2 | 9/2009 | Chahl et al. |

(Continued)

FOREIGN PATENT DOCUMENTS

EP    1096268    5/2001

OTHER PUBLICATIONS

McWilliams, et al., "A Simulation Environment for Evaluating Image Processing Techniques for UAV Applications," 09ATC-0054; 2009 SAE International (7 pages).

(Continued)

*Primary Examiner* — Ahmed A Berhan
(74) *Attorney, Agent, or Firm* — Grossman, Tucker et al

(57) ABSTRACT

The present disclosure relates to a vision system which may include a plurality of lenses coupled to an image sensor by a plurality of optical fiber bundles. Each of the plurality of lenses is configured to capture at least a portion of the scene. The image sensor may be located a distance from the plurality of lenses. The optical fiber bundles are configured to transmit optical image data from each lens to the image sensor. The image sensor is configured to convert the optical image data from each lens into corresponding electrical image data ("electrical image data") for each lens.

30 Claims, 8 Drawing Sheets

(56) References Cited

U.S. PATENT DOCUMENTS

| | | | |
|---|---|---|---|
| 7,619,754 | B2 | 11/2009 | Riel et al. |
| 8,466,406 | B2 | 6/2013 | Hvass et al. |
| 2004/0066449 | A1 | 4/2004 | Givon |
| 2006/0074557 | A1 | 4/2006 | Mulligan et al. |
| 2006/0268360 | A1* | 11/2006 | Jones .................. 358/448 |
| 2007/0103698 | A1 | 5/2007 | Liu et al. |
| 2007/0103699 | A1 | 5/2007 | Kohnen et al. |
| 2008/0033604 | A1 | 2/2008 | Margolin |
| 2008/0084568 | A1 | 4/2008 | Rich |
| 2008/0085077 | A1 | 4/2008 | Miyanari |
| 2008/0225406 | A1* | 9/2008 | Wada .................. 359/694 |
| 2008/0309949 | A1 | 12/2008 | Rueb |
| 2008/0316462 | A1 | 12/2008 | Riel et al. |
| 2009/0244534 | A1* | 10/2009 | Narayana et al. ......... 356/301 |
| 2010/0141767 | A1* | 6/2010 | Mohanty et al. ......... 348/159 |
| 2011/0106339 | A1 | 5/2011 | Phillips et al. |
| 2011/0273451 | A1 | 11/2011 | Salemann |
| 2011/0285590 | A1 | 11/2011 | Wellington |
| 2011/0295569 | A1 | 12/2011 | Hamke et al. |
| 2011/0301925 | A1 | 12/2011 | McWilliams, III et al. |
| 2012/0286147 | A1 | 11/2012 | Hvass et al. |

OTHER PUBLICATIONS

Chen, et al., "Fast Block Matching Algorithms for Motion Estimation," Department of Electrical and Electronic Engineering, The University of Hong Kong. IEEE International Conference on Acoustics, Speech, and Signal Processing, 1996. ICASSP-96 vol. 4.

Persson, "Visual-servoing Based Tracking for an UAV in a 3D simulation Environment," Proceedings of SPIE vol. 4714 (2002).

Shaw, et al., "Landmark recognition for localisation and navigation of aerial vehicles" Proceedings of the 2003 IEEURSJ, InU. Conference on Intelligent Robots and Systems, Las Vegas, Nevada Oct. 2003; pp. 42-47.

Rathinam, "Vision Based Following of Locally Linear Structures using an Unmanned Aerial Vehicle," Proceedings of the 44th IEEE Conference on Decision and Control, and the European Control Conference 2005, Seville, Spain, Dec. 12-15, 2005.

Wu, et al., "Vision-Aided Inertial Navigation for Flight Control," AIAA Guidance, Navigation, and Control Conference and Exhibit, Aug. 15-18, 2005, San Francisco, California. (13 pages).

Proctor, et al. "Vision-Only Aircraft Flight Control Methods and Test Results," AIAA Guidance, Navigation, and Control Conference and Exhibit, Aug. 16-19, 2004, Providence, Rhode Island. (16 pages).

Grzywna, et al., "Rapid Development of Vision-Based Control for MAVs through a Virtual Flight Testbed," Proceedings of the 2005 IEEE International Conference on Robotics and Automation, 2005. Issue Date: Apr. 18-22, 2005; pp. 3696-3702.

Chen, "Efficient Block Matching Algorithm for Motion Estimation," International Journal of Signal Processing 5;2. pp. 133-137.

Simulink 7, "Product brochure for The MathWorks," available at www.mathworks.com retrieved on Nov. 5, 2010.

General Dynamics, "Multiple Unified Simulation Environment/Air Force Synthetic Environment for Reconnaissance and Surveillance (MUSE/AFSERS)," available at http://www.gdc4s.com/content/detail.cfm?item=cf9ff114-9876-4e5d-b722-5fa932126f1d retrieved on Apr. 6, 2010.

Flightgear, "FlightGear Flight Simulator Product Features," available at http://www.flightgear.org/features.html, retrieved on Apr. 6, 2010.

The Mathworks, Inc., "Block Matching Estimate motion between images or video frame," available at http://www.mathworks.com/help/toolbox/vipblks/ref/blockmatching.html, retrieved on Apr. 6, 2010.

U.S. Office Action, mail date Dec. 11, 2012 issued in related U.S. Appl. No. 12/796,429 (10 pgs).

U.S. Office Action, mail date Jul. 26, 2013 issued in related U.S. Appl. No. 12/796,429 (10 pgs).

Notice of Allowance, mail date Apr. 19, 2013 issued in related U.S. Appl. No. 13/106,290 (9 pgs).

Dusha, et al; "Attitude Estimation for a Fixed-Wing Aircraft Using Horizon Detection and Optical Flow"; IEEE Computer Society; Digital Image Computing Techniques and Applications; 0-7695-3067-2/07; DOI 10.1109/DICTA.2007.89 (pp. 485-492).

Barjatya, Student Member, IEEE; "Block Matching Algorithms for Motion Estimation"; DIP 6620 Spring 2004 Final Project Paper (6 pgs).

U.S. Office Action, mail date Mar. 26, 2014 issued in related U.S. Appl. No. 12/796,429 (10 pgs).

* cited by examiner

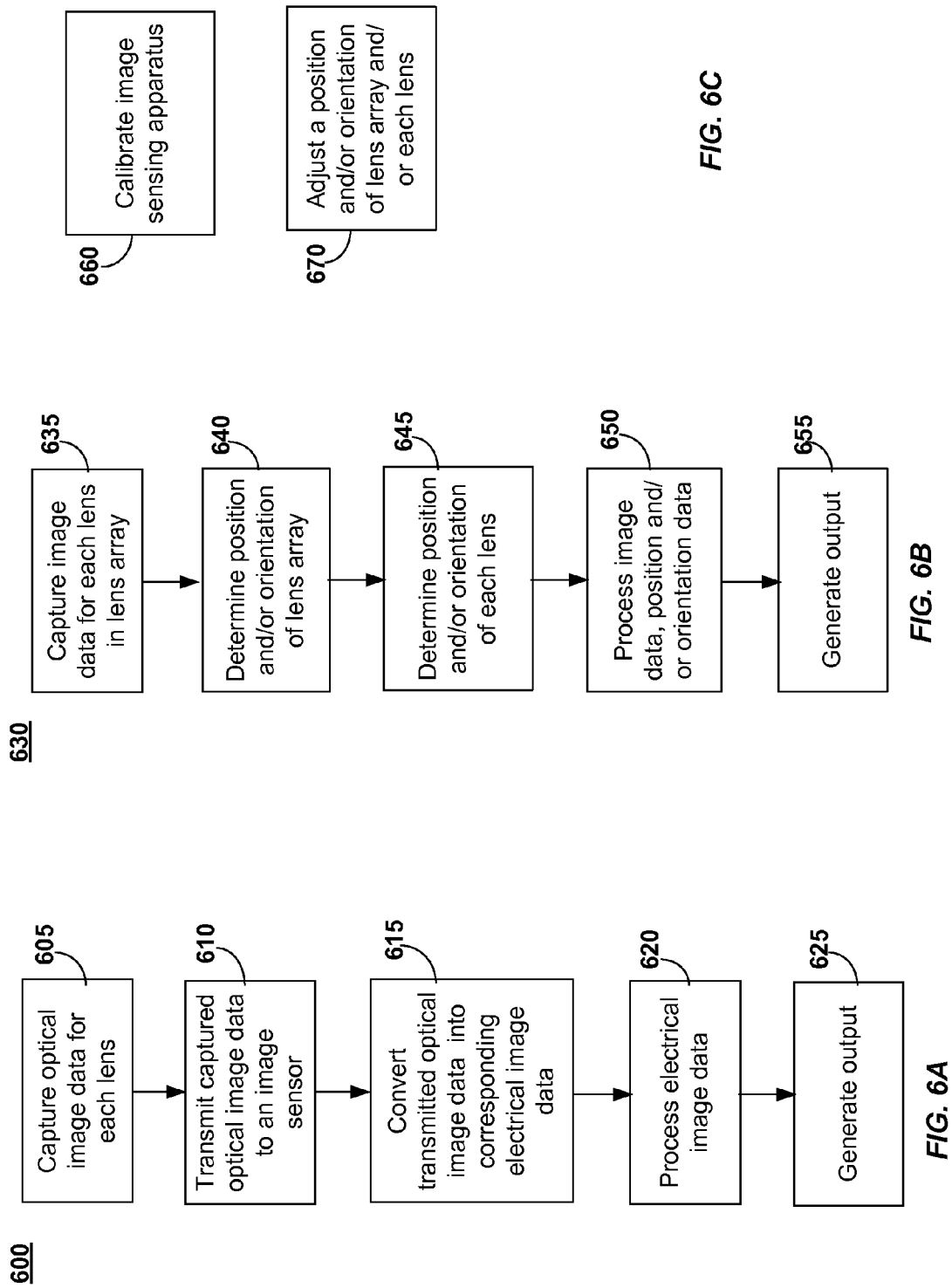

VISION SYSTEM

FIELD OF THE INVENTION

This disclosure relates to an apparatus, system and method configured for capturing, processing and displaying, one or more images.

BACKGROUND

Vision systems may use CCD (charge coupled device) or CMOS (complementary metal oxide semiconductor) image sensors for capturing visual images. Both the CCD and CMOS image sensors may convert a captured optical image (light) into an electrical signal. Such image sensors may have a generally rectangular sensing surface, thereby providing a rectangular viewing mode. It may be appreciated that such a viewing mode is configured for generating two-dimensional, rectangular visual images, e.g., for display on a screen, on a computer monitor and/or in a photograph.

It may be appreciated that only a portion of a scene may be captured by the image sensor. The portion may be limited by the field of view of a lens coupled to the image sensor. In some situations, it may be desirable to capture an image, or images, of a scene that include a larger portion or all of the scene. This may be accomplished using gimbaled pan and scan camera pointing systems, i.e., mechanical positioning systems, or wide angle lens systems. Both systems have drawbacks.

For example, mechanical positioning systems have moving parts, are relatively bulky and have limited viewing areas. Repositioning, i.e., panning and/or scanning, may take time such that a transient present in a scene for a finite amount of time may be missed. Portions of a scene may be excluded from captured images because the portion of the scene is outside the viewing area. In wide angle lens systems, increasing the lens angle may provide a wider field of view, i.e., may capture a greater portion of the scene, but may increase parallax distortion and loss of definition and resolution for an image capture area that is relatively nearer an edge of the lens. Wide angle lens systems may also be relatively bulky and relatively heavy compared to other lens systems.

SUMMARY

The present disclosure relates in one embodiment to an apparatus. The apparatus includes a plurality of lenses, each of the plurality of lenses configured to capture at least a portion of a scene. The apparatus further includes a plurality of optical fiber bundles, each of the plurality of optical fiber bundles having a first end and a second end, each the first end coupled to one of the plurality of lenses. The apparatus further includes an image sensor coupled to the second end of the plurality of optical fiber bundles, wherein each of the plurality of optical fiber bundles is configured to transmit optical image data corresponding to each the at least a portion of a scene from each the lens to the image sensor and the image sensor is configured to convert the optical image data into corresponding electrical image data.

The present disclosure relates in one embodiment to a system. The system includes a plurality of lenses, each of the plurality of lenses configured to capture at least a portion of a scene. The system further includes a plurality of optical fiber bundles, each of the plurality of optical fiber bundles having a first end and a second end, each the first end coupled to one of the plurality of lenses. The system further includes an image sensor coupled to the second end of the plurality of optical fiber bundles, wherein each of the plurality of optical fiber bundles is configured to transmit optical image data corresponding to each the at least a portion of a scene from each the lens to the image sensor and the image sensor is configured to convert the optical image data into corresponding electrical image data. The system further includes a processor coupled to the image sensor, the processor configured to process the electrical image data and to generate an output based on the electrical image data.

The present disclosure relates in another embodiment to a method. The method includes capturing optical image data representing at least a portion of a scene using a plurality of lenses coupled to a plurality of optical fiber bundles; transmitting the optical image data to an image sensor using the plurality of optical fiber bundles, the plurality of optical fiber bundles coupled to the image sensor; and converting the optical image data into electrical image data using the image sensor, the electrical image data corresponding to the optical image data.

In yet another embodiment, the present disclosure relates to an article comprising a storage medium having stored thereon instructions that when executed by a machine result in the following operations: capturing optical image data representing at least a portion of a scene using a plurality of lenses coupled to a plurality of optical fiber bundles; transmitting the optical image data to an image sensor using the plurality of optical fiber bundles, the plurality of optical fiber bundles coupled to the image sensor; and converting the optical image data into electrical image data using the image sensor, the electrical image data corresponding to the optical image data.

BRIEF DESCRIPTION OF THE DRAWINGS

The detailed description below may be better understood with reference to the accompanying figures which are provided for illustrative purposes and are not to be considered as limiting any aspect of the invention.

FIGS. 6A through 6C depict exemplary flow charts for capturing and processing image data.

DETAILED DESCRIPTION

In general, the present disclosure describes an apparatus, system and method configured to facilitate capturing a scene using a plurality of lenses. Each of the plurality of lenses is configured to capture at least a portion of the scene and may be positioned and/or oriented with respect to the scene and with respect to each other. The plurality of lenses may be coupled to an image sensor by a plurality of optical fiber bundles. The image sensor may be located a distance from the plurality of lenses. The optical fiber bundles are configured to transmit optical image data from each lens to the image sensor. The optical fiber bundles are coupled to the image sensor. A configuration of the coupled optical fiber bundles on the image sensor may provide a mapping of optical image data from each lens to a region, i.e., subset of pixels, of the image sensor. The image sensor is configured to convert the optical image data from each lens into corresponding electrical image data ("electrical image data") for each lens.

The portions of the scene captured by the plurality of lenses may or may not overlap. Whether the portions of the scene overlap depends, at least in part, on the position and/or orientation of each lens relative to the other lens(es) and/or an associated field of view of each lens. A processor, configured to receive electrical image data from the image sensor is configured to generate an output based, at least in part, on the received electrical image data, position and/or orientation of each lens, and/or the associated field of view of each lens. For example, the output may be a composite image corresponding to the captured scene that may be displayed to a user. In another example, the lenses may be positioned and/or oriented relative to each other to provide a binocular view of a portion of a scene and/or an object in the portion of the scene. In this example, the system may be used to determine a distance to the object.

Figure 1:
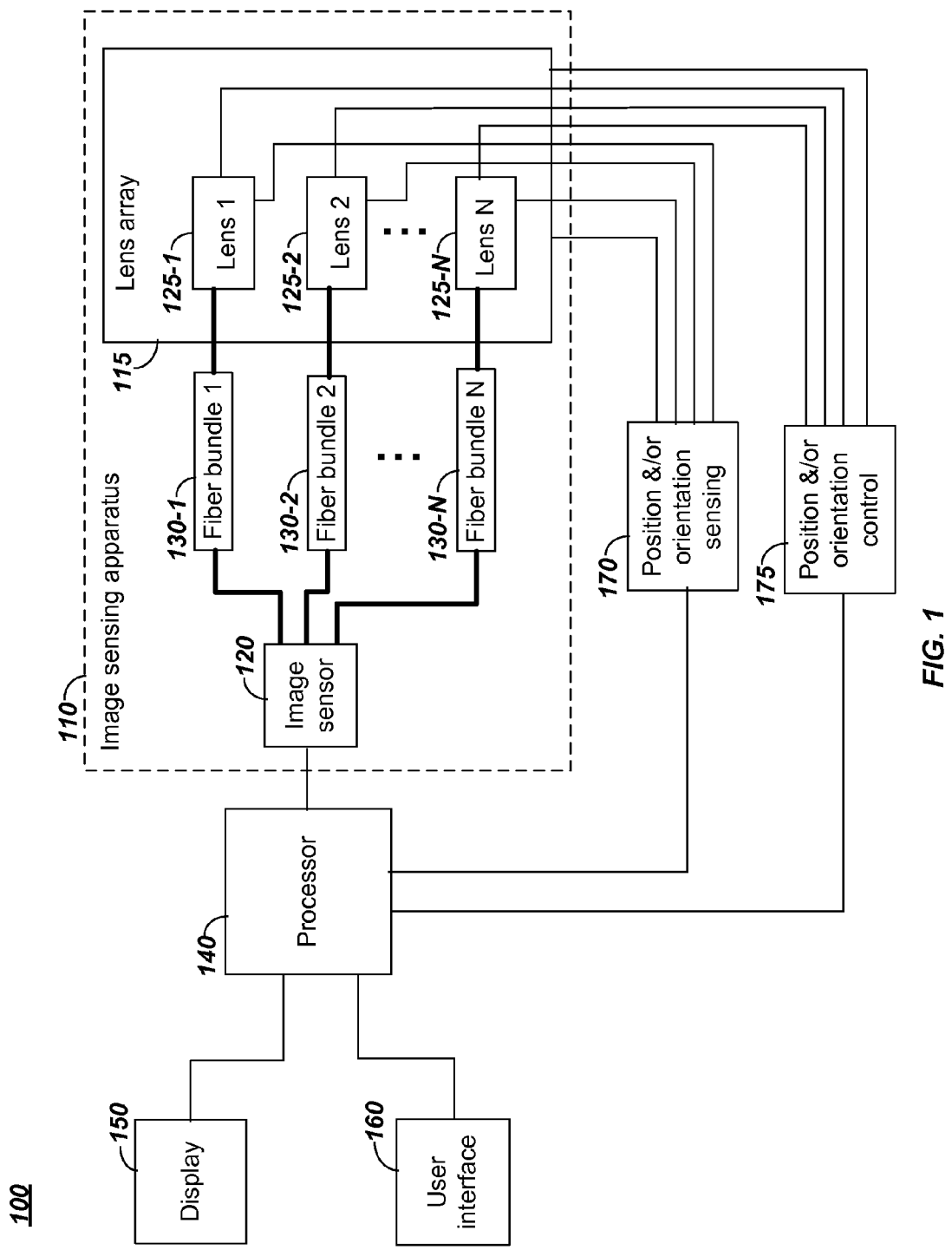
FIG. 1 depicts an exemplary system block diagram of a vision system including an image sensing apparatus consistent with the present disclosure.

Attention is directed to FIG. 1 which depicts a system block diagram of a vision system 100, consistent with the present disclosure. The system 100 may include an image sensing apparatus 110 coupled to a processor 140. The processor 140 may be coupled to a display 150 and a user interface 160. The image sensing apparatus 110 and processor 140 may be coupled to a position and/or orientation sensing block 170 and/or a position and/or orientation control block 175.

The image sensing apparatus 110 may include a lens array 115. The lens array 115 includes a plurality of lenses 125-1, 125-2, ..., 125-N. Each lens 125-1, 125-2, ..., 125-N may be coupled to the image sensor 120 by respective fiber bundles 130-1, 130-2, ..., 130-N. Each lens 125-1, 125-2, ..., 125-N is configured to capture at least a portion of a scene and to provide optical image data representing the at least a portion of the scene to the respective optical fiber bundles 130-1, 130-2, ..., 130-N. Each optical fiber bundle 130-1, 130-2, ..., 130-N is configured to carry the optical image data from each lens 125-1, 125-2, ..., 125-N to the image sensor 120. Each optical fiber bundle 130-1, 130-2, ..., 130-N may be coupled to a portion of image sensor 120, i.e., each optical fiber bundle may couple its associated optical image data to a subset of pixels in the image sensor 120. The image sensor 120 is configured to receive optical image data from each lens 125-1, 125-2, ..., 125-N and to convert the optical image data into corresponding electrical image data ("electrical image data").

Figure 2:
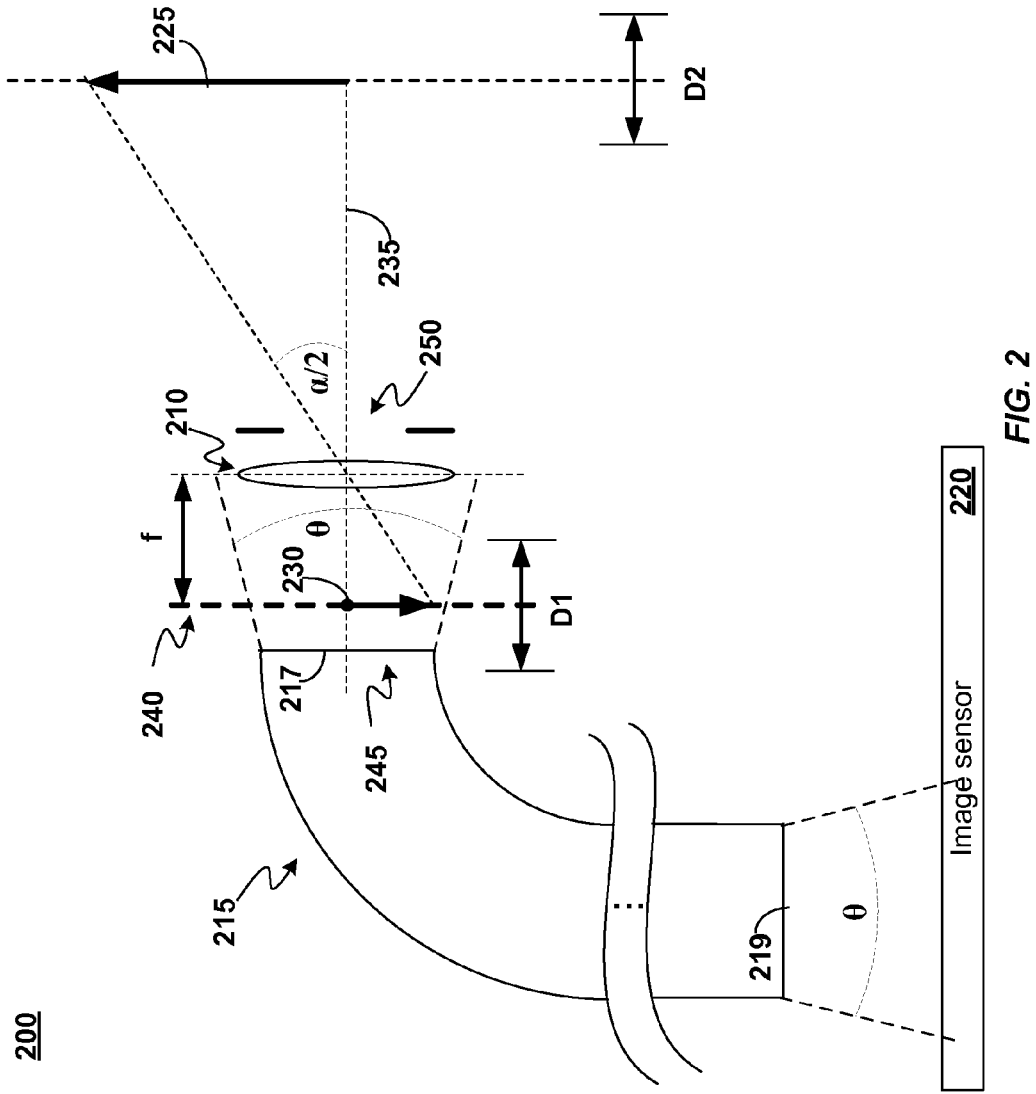
FIG. 2 is a sketch of a lens, optical fiber bundle, image sensor and object, illustrating optical parameters.

Attention is directed to FIG. 2 which is a sketch 200 of a lens 210, optical fiber bundle 215, image sensor 220 and object 225. The sketch 200 is provided to illustrate parameters associated with the optics of the vision system 100, as described herein. Lens 210 has an associated focal point 230. The focal point 230 for lens 210 is a point where a collimated beam (i.e., all rays in parallel) is focused to a point by lens 210. The rays are in parallel with a lens axis 235. The lens axis 235 is perpendicular to a surface of the lens 210 and passes through the lens 210 at a center point. A focal length, f, is a distance from the lens 210 to the focal point 230, measured along the lens axis 235. A focal plane 240 is a plane perpendicular to the lens axis 235 that contains the focal point 230. An image plane 245 is a plane where an image of an object and/or scene captured by a lens, e.g., lens 210 is projected. For example, the image plane 245 of lens 210 may be a first end 217 of fiber bundle 215. An image of a distant object captured by the lens and projected on the image plane 245 may be in focus when the image plane is positioned at or near the focal plane 240. For example, if the image plane 245 coincides with the focal plane 240, the image will be "in focus". Depth of focus, D1, corresponds to a range of positions of the image plane 245 relative to the focal plane 240 where an image may be "in focus". A size of an image of an object relative to a size of the object in the scene, e.g., magnification, may depend on focal length.

The lens 210 may include an associated aperture 250 configured to control and/or adjust an amount of light that may pass through the lens 210. Lens aperture may be understood as an effective diameter of a lens. The associated lens aperture may be related to a brightness, i.e., amount of light, in the image. In some embodiments, the lens aperture may be adjustable, using, e.g., an iris. In this embodiment, the effective diameter of a lens may be less than an actual diameter of the lens.

Angle of view, $\alpha$, corresponds to an angular extent of a scene that may be captured by a lens and projected onto the focal plane 240 and/or image plane 245. Angle of view $\alpha$ depends on focal length, f, and/or distance between the lens 210 and the first end 217 of the fiber bundle 215 and a dimension of the first end 217 of the fiber bundle 215. The dimension may be a diameter of the fiber bundle for a fiber bundle with a generally circular cross-section and/or a length and/or width of the fiber bundle for a fiber bundle with a generally rectangular or ellipsoidal cross-section. Angle of view may be measured in radians and/or degrees. Field of view may correspond to angle of view 255. Field of view provides rectilinear dimensions corresponding to a portion of a scene and depends on angle of view and a distance from the lens 210 to an object and/or portion of a scene captured by the lens 210. Field of view is a function of lens focal length, f, a size of the image plane and distance from lens to an area of the scene being captured. Field of view corresponds to a portion of the scene that may be captured by the lens 210 and projected onto the image plane 245. Depth of field, D2, is a range of object positions in a scene relative to a lens that will appear in focus at an image plane position, e.g., at the first end 217 of fiber bundle 215.

Similarly, there are optical parameters associated with a fiber bundle 215 that affect capture of optical image data from lens 210. In other words, lens 210 may be configured to capture all or a portion of scene and to provide optical image data corresponding to the captured all or portion of the scene to fiber bundle 215. For example, as described herein, the first end 217 of fiber bundle 215 may correspond to the image plane 245 for lens 210. Accordingly, the first end 217 of the fiber bundle 215 may be positioned within the depth of focus, D1, of lens 210 in order to focus the optical image data corresponding to the captured portion of the scene from lens 210 to fiber bundle 220. Coupling optical image data from lens 210 to fiber bundle 220 may depend on optical parameters associated with fiber bundle 220. For example, each optical fiber in fiber bundle 215 may have an associated acceptance cone. Acceptance cone is a solid angle that is related to a numerical aperture of an optical fiber. The numerical aperture of the optical fiber represents a size or degree of openness of the acceptance cone. The optical fiber may include a fiber core that may be coated with a cladding material. The numerical aperture ("N.A.") of the fiber is defined as $$N.A. = \frac{\sqrt{n_1^2 - n_2^2}}{n}$$

where $n_1$ is the refractive index of the fiber core, $n_2$ is the refractive index of the fiber cladding and $n$ is the refractive index of the medium that the fiber is in. The refractive index for air is approximately 1.00. For a fiber in air, without cladding, $n_2$ may equal the refractive index of air, i.e., approx. 1.00. The solid angle, $\theta$, of the acceptance cone of the fiber is then the arcsine of the numerical aperture, i.e., $$\theta = \sin^{-1}\left(\frac{\sqrt{n_1^2 - n_2^2}}{n}\right).$$

Refractive index is a ratio of a speed of light in a vacuum to a speed of light in a medium, e.g., fiber core.

An optical fiber bundle, e.g., optical fiber bundle 215, may similarly have an associated acceptance cone based on a numerical aperture for the optical fiber bundle 215. An optical fiber and/or optical fiber bundle may act as an optical waveguide, i.e., may guide optical energy received at a first end, along its length to a second end. An optical fiber and/or optical fiber bundle may propagate optical energy, e.g., optical image data, that arrives within the acceptance cone of the optical fiber and/or optical fiber bundle. Optical image data, received by the optical fiber and/or optical fiber bundle may then propagate along the fiber(s) by internal reflection at an interface between the fiber core and cladding or air.

An optical fiber bundle may include one or more optical fibers. Each optical fiber may provide one or more propagation paths. An optical fiber bundle may therefore provide one or more propagation paths, i.e., optical fiber modes. An optical fiber may have a fiber core diameter of greater than or equal to about 1.0 μm (micrometer). For example, an optical fiber may have a fiber core diameter of about 5.0 μm. In another example, an optical fiber may have a fiber core diameter of about 50 μm. An optical fiber bundle may include at least about 200 optical fibers. For example, an optical fiber bundle may include about 200 to about 300 optical fibers per bundle. A number of optical fibers in an optical fiber bundle may be related to a diameter of the optical fiber bundle. For example, an about 5 mm diameter optical fiber bundle may include between about 8000 and about 9000 optical fibers with a fiber diameter of about 50 μm. In another example, an about 5 mm diameter optical fiber bundle may include about 200,000 to about 1,000,000 optical fibers with a fiber diameter of about 5 μm. In yet another example, an optical fiber bundle may include more than about 10 million optical fibers. In this example, the optical fiber bundle may have a relatively larger diameter and/or may include optical fibers of relatively smaller diameter.

An optical fiber and/or optical fiber bundle may emit optical energy from its second end in an output cone. Similar to the acceptance cone of the first end, the output cone may be defined by a solid angle related to the numerical aperture of the fiber and/or optical fiber bundle. A second end 219 of the optical fiber bundle 215 may be positioned relative to an image sensor 220. Optical image data that is provided from lens 210 to optical fiber bundle 215 may propagate along optical fiber bundle 215 to the second end 219. Similar to the first end 217, the numerical aperture may correspond to an "acceptance angle" at the second end 219. Here, the acceptance angle and a distance between the second end of the optical fiber and a surface of the image sensor may define a coverage area of the image sensor 220 by the optical image data and/or an amount of optical coupling between the optical fiber bundle and the image sensor. The coverage area may correspond to a region (i.e., a subset of pixels) of the image sensor 220. The region may include a plurality of pixels. Positioning the second end of the optical fiber bundle relative to the image sensor 220 may provide a mapping of optical image data to electrical image data. The mapping may be used to generate a composite image from electrical image data as described herein.

The image sensor 220 may be configured as an array of pixels. A pixel may be understood as a two-dimensional picture element. A pixel may correspond to a minimum sample size of a detected image. A size of an image sensor may correspond to a number of pixels in the array of pixels and may be related to a two-dimensional size of each pixel. For example, a pixel may be rectangular, square or circular. A pixel size may be understood as a length of a side of a square pixel or a diameter of a circular pixel. Pixel sizes may range from about 1 μm to about 12 μm. An image sensor may include from about 1 megapixel (one million pixels) to about 21 megapixels (twenty-one million pixels). For example, an image sensor size may range from about 2.4 mm by about 1.8 mm to about 36 mm by about 24 mm.

Turning again to FIG. 1, as described herein, the lens array 115 may include a plurality of lenses 125-1, 125-2, ..., 125-N. Each lens 125-1, 125-2, ..., 125-N may be configured to capture a portion or all of a scene. The portion of a scene captured may depend, at least in part, on characteristics of the lens. For example, each lens 125-1, 125-2, ..., 125-N may have an associated angle of view corresponding to a horizontal, vertical and/or diagonal angular extent of the scene captured by the lens. For example, the angle of view of a lens 125-1, 125-2, ..., 125-N may be in a range of about 1 degree to about 120 degrees. In another example, the angle of view of a lens 125-1, 125-2, ..., 125-N may be in a range of about 5 degrees to about 90 degrees. In yet another example, the angle of view of a lens 125-1, 125-2, ..., 125-N may be in a range of about 10 degrees to about 75 degrees.

Each lens 125-1, 125-2, ..., 125-N may be formed of a number of materials. For example, each lens 125-1, 125-2, ..., 125-N may be formed of a glass. The glass may be formed of, e.g., silica (silicon dioxide). The glass may include materials other than SiO2. Each lens 125-1, 125-2, ..., 125-N may be formed of a plastic, e.g., acrylic. Glass may be relatively resistance to scratching while plastic may allow formation of aspherical lens elements.

Each lens 125-1, 125-2, ..., 125-N may be coupled to a fiber bundle 130-1, 130-2, ..., 130-N. Each fiber bundle 130-1, 130-2, ..., 130-N may have a first end and a second end. Each lens may be configured to focus optical image data onto the first end of a fiber bundle. Each lens may be configured to focus optical image data within an acceptance cone of the fiber bundle which may be determined by the acceptance cones of the individual optical fibers in the fiber bundle. Accordingly, each lens may be positioned relative to the first end of each fiber bundle. The position may be fixed or may be adjustable. For a fixed position, the lens/fiber bundle may be configured for infinity focus. For example, each fiber bundle 130-1, 130-2, ..., 130-N may be coupled to a lens 125-1, 125-2, ..., 125-N, using an adhesive. In another example, each fiber bundle 130-1, 130-2, ..., 130-N may be fused to a lens 125-1, 125-2, ..., 125-N using temperature. In yet another example, each fiber bundle 130-1, 130-2, ..., 130-N may be coupled to a lens 125-1, 125-2, ..., 125-N with an air gap between the lens and the first end of the fiber bundle. In an embodiment, the first end of each fiber bundle 130-1, 130-2, ..., 130-N may be processed, e.g., machined, to form a lens 125-1, 125-2, ..., 125-N. In another embodiment, the first end of each fiber bundle 130-1, 130-2, ..., 130-N may be processed, e.g., machined, to form a surface configured to facilitate coupling to a lens 125-1, 125-2, ..., 125-N.

As described herein, each fiber bundle 130-1, 130-2, ..., 130-N may include one or more optical fibers. An optical fiber bundle may include at least about 200 optical fibers. For example, an optical fiber bundle may include about 200 to about 300 optical fibers per bundle. A number of optical fibers in an optical fiber bundle may be related to a diameter of the optical fiber bundle. For example, an about 5 mm diameter optical fiber bundle may include between about 8000 and about 9000 optical fibers with a fiber diameter of about 50 µm. In another example, an about 5 mm diameter optical fiber bundle may include about 200,000 to about 1,000,000 optical fibers with a fiber diameter of about 5 µm. In yet another example, an optical fiber bundle may include more than about 10 million optical fibers.

Each optical fiber may have a substantially circular cross-section. Each of the plurality of fiber bundles 130-1, 130-2, ..., 130-N may have an associated cross-section that may also be substantially circular. The second end of each fiber bundle may be coupled to the image sensor 120. A position of each fiber in a bundle relative to each other fiber in the bundle at the first end may be preserved at the second end. In this manner coherent optical image data may be provided to the image sensor 120 from each lens 125-1, 125-2, ..., or 125-N.

A number of optical fibers in an optical fiber bundle may correspond to a number of pixels in the region/coverage area of the image sensor 220. For example, a ratio of fibers to pixels may range from about two to one to about one to two. In some embodiments, the ratio of fibers to pixels may be about one to one. For example, a commercial off-the-shelf image sensor may be about 36 mm by about 24 mm and may include about 16 megapixels (sixteen million pixels). Continuing with this example, 16 lenses of 5 mm lens diameter may be coupled to the image sensor by optical fiber bundles. Each lens of the 16 lenses may be coupled to the image sensor by a 5 mm diameter optical fiber bundle, i.e., 16 optical fiber bundles. Each optical fiber bundle may include about 1 million optical fibers of optical fiber diameter about 5 µm, corresponding to the about 16 megapixels of the image sensor.

An optical fiber and/or optical fiber bundle may be formed of a glass or plastic material. For example, a glass optical fiber may be formed of silica (silicon dioxide). In another example, a glass optical fiber may include a fluoride glass such as fluorozirconate or fluoroaluminate. In yet another example, a glass optical fiber may include a chalcogenide glass. Plastic optical fibers may be formed of polymer materials such as PMMA (poly methylmethacrylate) (acrylic), polystyrene or a polycarbonate. Optical fibers formed of glass may provide lower propagation losses compared to optical fibers formed of plastic. Optical fibers formed of a plastic material may be mechanically more robust and flexible than optical fibers formed of a glass material and may be lower cost.

Accordingly, the plurality of lenses 125-1, 125-2, ..., 125-N may be coupled to the image sensor 120 by, e.g., the plurality of fiber bundles 130-1, 130-2, ..., 130-N. The image sensor 120 may be located a distance from each lens 125-1, 125-2, ..., or 125-N. For example, each distance may be greater than about one millimeter (1.0 mm). In another example, each distance may be in the range of about one half inch (1.27 cm) to about ten feet (3.05 meters). Each lens 125-1, 125-2, ..., or 125-N may be a similar distance from the image sensor 120 as each other lens 125-1, 125-2, ..., or 125-N or each lens may be a different distance from the image sensor 120 than one or more other lenses 125-1, 125-2, ..., or 125-N.

The image sensor 120 may be a passive pixel sensor or an active pixel sensor. For example, a CCD (charge-coupled device) image sensor is a passive pixel sensor and a CMOS (complementary metal oxide semiconductor) image sensor is an active pixel sensor. Both types of image sensor may be configured to convert the optical image data into corresponding electrical image data. The electrical image data may then be read from the image sensor for processing and/or display. For example, a CCD image sensor may provide an analog electrical signal output based on received optical image data. A CMOS image sensor may be configured to provide a digital electrical signal output based on received optical image data.

Figure 3C:
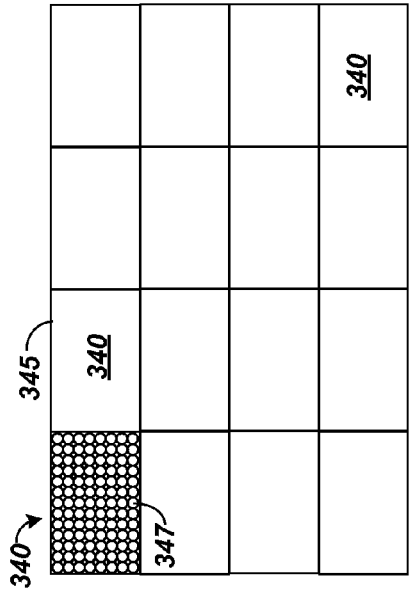
FIGS. 3A through 3D depict some examples of distributions of fiber bundle cross sections on an image sensor.
Figure 3D:
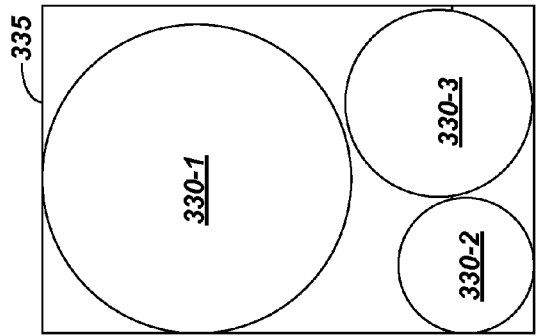
Figure 3A:
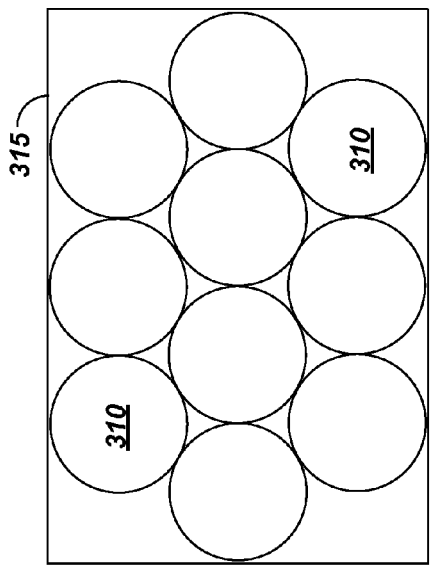
Figure 3B:
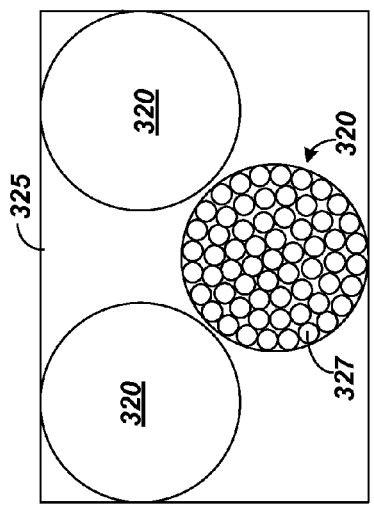

Attention is directed to FIGS. 3A through 3D depicting examples of distributions of fiber bundles coupled to image sensors. It may be appreciated that various other distributions may be implemented, within the scope of this disclosure. Coupling areas 310, 320, and 330 corresponding to fiber bundle cross-sectional areas and/or acceptance cones are depicted in FIGS. 3A through 3C as circles. Coupling areas 340 corresponding to fiber bundle cross-sectional areas and/or acceptance cones are depicted in FIG. 3D as rectangles. Image sensors 315, 325, 335 and 345 are depicted as substantially rectangular for ease of illustration. Other shapes may be implemented. FIGS. 3B and 3D further illustrate cross-sections 327, 347 of individual fibers within a fiber bundle.

It may be appreciated that each coupling area 310, 320, 330 and 340 may be associated with a plurality of pixels. In other words, each fiber bundle 130-1, 130-2, ..., 130-N may be coupled to a subset of pixels in the image sensor. A number of pixels in each subset of pixels associated with a coupling area 310, 320, 330 and 340 may depend on the size of each pixel in the image sensor, a number of pixels in the image sensor 315, 325, 335 and 345 and a relative size of a cross section of each fiber bundle 130-1, 130-2, ..., 130-N. As described herein, the number of pixels in each coupling area may correspond to the number of fibers in the optical fiber bundle.

It may be appreciated that each fiber bundle 130-1, 130-2, ..., 130-N, coupled to the image sensor 120 may define an angle between an axis of the fiber bundle 130-1, 130-2, ..., 130-N and a surface of the image sensor. In a preferred embodiment, the angle may be about 90 degrees, i.e., a fiber bundle may be substantially perpendicular to the surface of the image sensor. Such an angle may provide relatively better optical coupling between the fiber bundle and the image sensor.

Each fiber bundle may be mechanically coupled to the image sensor. For example, a fiber bundle formed of a glass or a plastic may be bonded to the image sensor using, e.g., an adhesive. In another example, a fiber bundle formed of glass may be fused to the image sensor using temperature processing method. In yet another example, a fiber bundle may be optically coupled to the image sensor through an air gap and focused on a number of associated pixels. In this example, the fiber bundle may be positioned a distance from the image sensor.

Advantageously, positioning the plurality of lenses 125-1, 125-2, ..., 125-N a distance from the image sensor 120 may provide a relatively more robust configuration compared to a configuration where a lens and an image sensor are directly coupled. For example, image sensors and associated electronic components, e.g., processor 120, may be more sensitive to environmental conditions such as temperature and/or vibration than lenses and/or fiber bundles. Positioning the image sensor 120 and/or processor 140 a distance from the lens array 115 may allow the image sensor 120 and/or processor 140 to be protected from the environmental conditions.

Figure 4A:
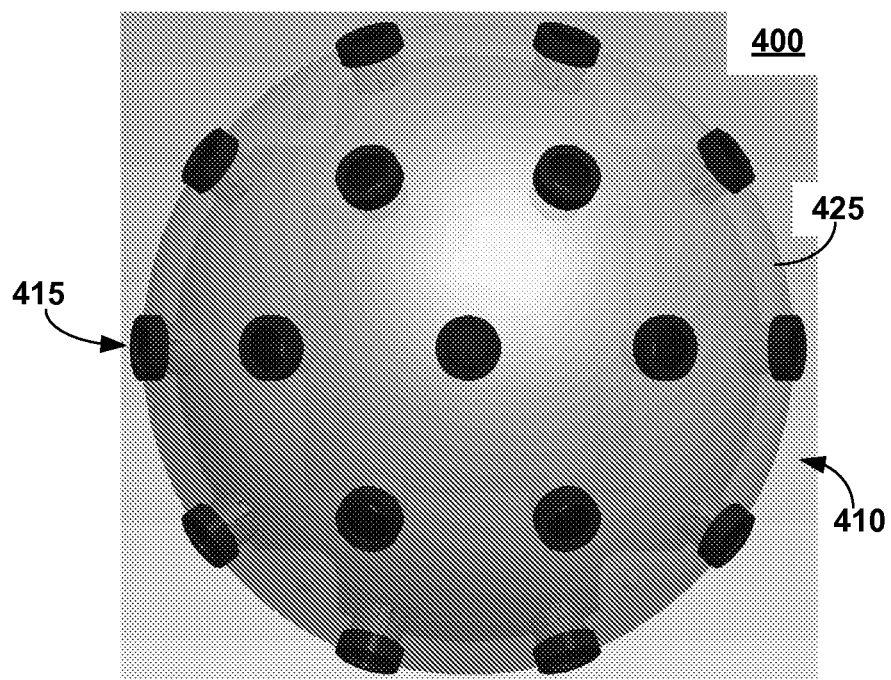
FIGS. 4A and 4B depict two sketches of a hemispherical lens array with image sensor consistent with the present disclosure.
Figure 4B:
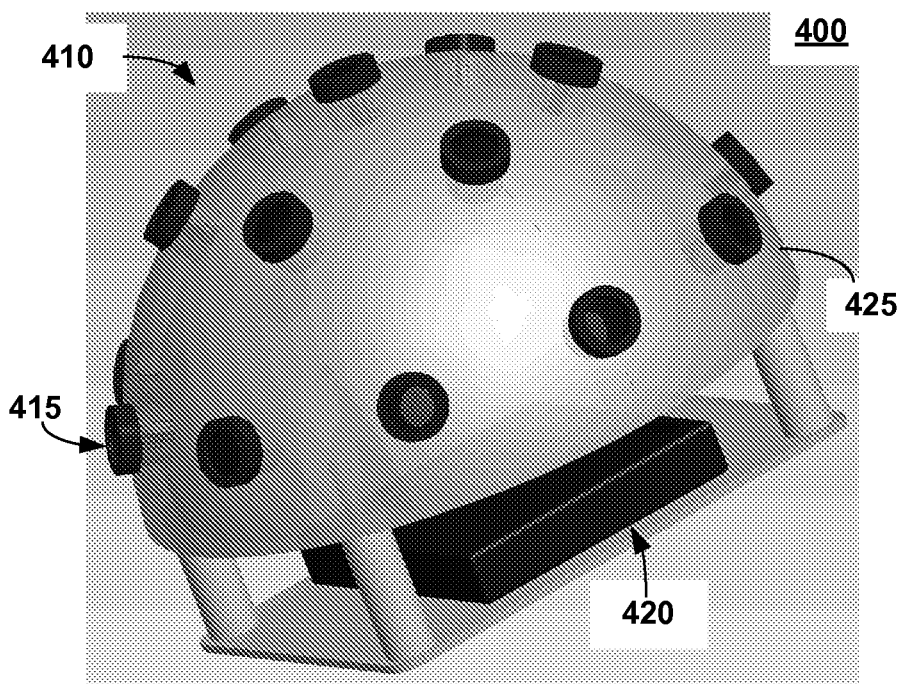

Attention is directed to FIGS. 4A and 4B depicting two sketches of a hemispherical lens array 410 with image sensor 420 consistent with the present disclosure. The lens array 410 includes a plurality of lenses 415 distributed over a surface 425 of a hemisphere. For example, seventeen lenses 415 may be distributed of the surface 425 of the hemisphere. Other distributions of lenses are possible, including other geometries of lens array 410 and/or distributions and/or number of lenses within each lens array. Each lens 415 may be coupled to the image sensor 420 by an optical fiber bundle as described herein. Accordingly, in the context of the present disclosure, a plurality of lenses may be understood as at least 2 lenses, and up, e.g., 100 lenses, including all values therein, in 1 lens increments.

Figure 5A:
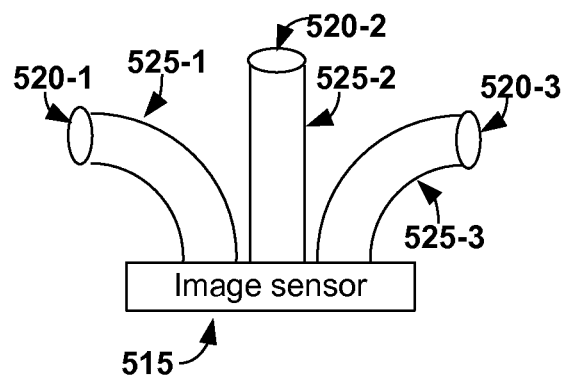
FIGS. 5A and 5B depict sketches of two examples of vision image sensing apparatuses consistent with the present disclosure.
Figure 5B:
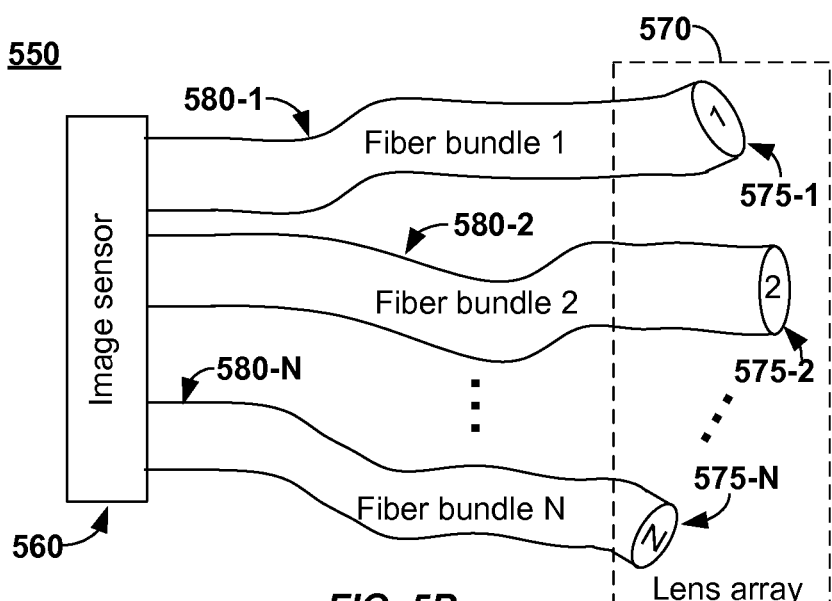

Attention is directed to FIGS. 5A and 5B depicting sketches of two examples of vision apparatuses 510, 550 consistent with the present disclosure. Apparatus 510 includes an image sensor 515 coupled to a plurality of lenses 520 by a plurality of optical fiber bundles 525-1, 525-2, 525-3. Each fiber bundle 525-1, 525-2, 525-3 is coupled to an associated lens 520-1, 520-2, 520-3 at a first end and to the image sensor 515 at a second end. At the second end, each fiber bundle 525-1, 525-2, 525-3 is substantially perpendicular to a surface of image sensor 515. The first end of each fiber bundle and associated lens 520-1, 520-2, 520-3 may be positioned at any angle with respect to image sensor 515 and each other fiber bundle, limited only by mechanical constraints associated with each fiber bundle 525-1, 525-2, 525-3. An angle of view and/or field of view of each lens 520-1, 520-2, 520-3 may or may not overlap.

Apparatus 550 includes an image sensor 560 coupled to a lens array 570 including a plurality of lenses 575-1, 575-2, . . . , 575-N by a plurality of optical fiber bundles 580-1, 580-2, . . . , 580-N. Similar to apparatus 510, each fiber bundle 580-1, 580-2, . . . , 580-N is coupled to an associated lens 575-1, 575-2, . . . , 575-N at a first end and to the image sensor at a second end. At the second end, each fiber bundle 580-1, 580-2, . . . , 580-N is substantially perpendicular to a surface of image sensor 560. The first end of each fiber bundle 580-1, 580-2, . . . , 580-N and associated lens 575-1, 575-2, . . . , 575-N may be positioned at any angle with respect to image sensor 560 and each other fiber bundle, limited only by mechanical constraints associated with each fiber bundle 580-1, 580-2, . . . , 580-N.

FIGS. 4A, 4B, 5A and 5B illustrate some possible configurations of image sensing apparatus 110. It may be appreciated that other configurations are possible within the scope of the present disclosure. Generally, an image sensor is coupled to a plurality of lenses by a plurality of optical fiber bundles, as described herein. The plurality of lenses are configured to capture a portion or all of a scene. Each lens may capture an associated portion of a scene. The associated portions of the scene may or may not overlap. Each lens of the plurality of lenses may be positioned relative to each other lens of the plurality of lenses. Coupling the lenses to the image sensor using optical fiber bundles may provide flexibility in positioning the lenses while preserving an orientation of an end of each fiber bundle relative to a surface of the image sensor. Preserving the orientation of each optical fiber bundle relative to the surface of the image sensor is configured to facilitate coupling optical image data from each fiber bundle to the image sensor.

Turning again to FIG. 1, the processor 140 is configured to receive the corresponding electrical image data from the image sensor 120. The term "processor" as used herein may include programmable hardware elements and/or a combination of hardware and software and/or firmware. For example, a processor may be a microcontroller, e.g., including a CPU, memory (e.g., read/write and/or read-only), and/or peripherals capable of input and output. In another example, a processor may be implemented as an ASIC (Application-specific integrated circuit), i.e., a "system on a chip", or an FPGA (Field-programmable gate array), or the like. The processor 140 may be configured to process the electrical image data. For example, the processor 140 may be configured to display an image based on the processed electrical image data on, e.g., the display 150. The processor 140 may be configured to receive input from a user, using user interface 160.

In some embodiments, the system 100 may include position and/or orientation sensing 170 and/or position and/or orientation control 175. Position and/or orientation sensing 170 may be coupled to the processor 140, the lens array 115 and/or one or more lenses 125-1, 125-2, . . . , 125-N. The position and/or orientation sensing 170 may be configured to sense a position and/or orientation of the lens array 115 and/or a lens 125-1, 125-2, . . . , or 125-N. The position and/or orientation of the lens 125-1, 125-2, . . . , or 125-N may be sensed relative to the position and/or orientation of the lens array 115 and/or one or more of the other lenses 125-1, 125-2, . . . , and 125-N. The sensed position and/or orientation data may be used to generate a composite image for display, e.g., on display 150.

The position and/or orientation of the lens array 115 and/or a lens 125-1, 125-2, . . . , or 125-N fixed or may be adjustable. A fixed position and/or orientation may be predetermined, i.e., may be known without sensing. For example, the fixed position and/or orientation may be defined at manufacturing and/or assembly of the lens array 115. An adjustable, i.e., variable, position and/or orientation may be sensed dynamically using a position and/or orientation sensor. For example, global position may be sensed using a GPS (global positioning system). Global position may be understood as a position relative to the earth. Local position may be sensed locally, i.e., relative to a lens array 115 assembly or a lens 125-1, 125-2, . . . , or 125-N in the lens array 115. For example, local position may be sensing using magnetoresistive sensors and/or Hall effect devices, as may understood by those skilled in the art. Orientation may be sensed using a compass, i.e., based on earth's magnetic field. Orientation may be sensed using a gyroscope. Barometric pressure sensing may be used to sense altitude. For a system 100 that may be moving, an inertial navigation system may be used to determine position and/or orientation. In such a system, based on an initial position and/or orientation, a current position and/or orientation may be determined based on the initial position and/or orientation, motion, e.g., accelerometer, data and/or orientation, e.g., gyroscope, data.

Position and/or orientation control 175 may be configured to adjust a position and/or orientation of the lens array 115 under control of the processor 140. The position and/or orientation control may be further configured to adjust a position and/or orientation of a lens 125-1, 125-2, . . . , or 125-N. The position and/or orientation of a lens 125-1, 125-2, . . . , or 125-N may be adjusted relative to the position and/or orientation of the lens array 115 and/or one or more other lenses 125-1, 125-2, . . . , 125-N. For example, based on an input from the user interface 160, the position and/or orientation of the lens array 115 and/or one or more lenses 125-1, 125-2, . . . , 125-N may be adjusted.

In an embodiment, the lens array 115 may be configured as a lens array assembly. For example, the lens array assembly may include the lenses 125-1, 125-2, . . . , 125-N, mechanically coupled together so that adjusting the position and/or orientation of the lens array 115, adjusts the position and/or orientation of the lenses 125-1, 125-2, . . . , 125-N in the lens array 115. In this embodiment, the position and/or orientation of each lens 125-1, 125-2, . . . , or 125-N may be adjustable relative to the position and/or orientation of the lens array 115 assembly and/or position and/or orientation of one or more other lenses. In another embodiment, the lens array 115 may be configured as individual lenses 125-1, 125-2, . . . , 125-N that may not be mechanically coupled. In this embodiment, the position and/or orientation of each lens 125-1, 125-2, . . . , or 125-N may be adjustable relative to the position and/or orientation of one or more other lenses 125-1, 125-2, . . . , or 125-N.

Attention is directed to FIGS. 6A through 6C which are exemplary flow charts 600, 630, 660, 670 for image capture and processing using an apparatus and/or system consistent with the present disclosure. Referring to FIG. 6A, program flow 600 may begin with capturing 605 optical image data for each lens. For example, each lens 125-1, 125-2, . . . , 125-N of lens array 115 may be configured to capture at least a portion of a scene. The captured optical image data may be transmitted 610 to an image sensor. For example, the captured optical image data from each lens 125-1, 125-2, . . . , 125-N may be transmitted to image sensor 120 by respective optical fiber bundles 130-1, 130-2, . . . , 130-N. Each optical fiber bundle may be coupled to a subset of pixels in image sensor 120. The captured and transmitted optical image data may be converted 615 into corresponding electrical image data by, e.g., image sensor 120. The electrical image data may then be processed 620 and an output may be generated 625. For example, processor 140 may be configured to receive and process the electrical image data and to generate an output corresponding to the processed image data for display to a user on display 150. The generated output may be based on a mapping of optical image data from each fiber bundle to a subset of pixels in the image sensor.

Referring to FIG. 6B, program flow 630 may begin with capturing 635 image data for each lens in a lens array. A position and/or orientation of the lens array may be determined 640. A position and/or orientation of each lens in the lens array may be determined 645. The image data, position and/or orientation data may then be processed 650 and an output may be generated 655.

For example, optical image data corresponding to at least a portion of a scene may be captured by each lens 125-1, 125-2, . . . , 125-N in lens array 115. The position and/or orientation of the lens array 115 may be determined using position and/or orientation sensing block 170. The position and/or orientation of each lens 125-1, 125-2, . . . , 125-N in the lens array 115 may then be determined. The position and/or orientation of each lens 125-1, 125-2, . . . , 125-N may be determined relative to the position and/or orientation of the lens array 115. For example, the position and/or orientation may be determined using sensors as described herein. In another example, the position and/or orientation may be predetermined, as described herein. In this example, determining the position and/or orientation may include retrieving the predetermined position and/or orientation data. The position and/or orientation of each lens 125-1, 125-2, . . . , 125-N may then be determined relative to each other lens 125-1, 125-2, . . . , 125-N based on the determinations of operations 640 and/or 645. The image data, position and/or orientation data may then be processed 650 by processor 140. Processing 650 may include mapping optical image data from each optical fiber bundle to a region of image sensor 120. Processing 650 may include scaling and/or rotating electrical image data corresponding to optical image data. The image data from each lens, corresponding to the at least a portion of the scene captured by each lens may be combined based, at least in part, on the position and/or orientation data for each lens to generate a composite image. The composite image may then be displayed to a user on display 150.

Referring to FIG. 6C, image sensing apparatus may be calibrated 660. The calibration operation 660 is configured to facilitate combining at least a portion of a scene captured by each lens in a lens array into, e.g., a composite image. Calibration may be used to determine a mapping of optical image data from each lens/optical fiber bundle to a region, i.e., subset of pixels, in the image sensor. For example, the calibration operation 660 may include providing a target screen. The target screen may include targets at known locations on the screen. Position and/or orientation of each lens relative to the target screen may be known or may be determined. Based on the locations of targets on the screen, the position and/or orientation of each lens relative to the screen and a corresponding location of each target relative to the image sensor, the image sensing apparatus may be calibrated. The targets may be used as reference points. A position and/or orientation of each lens may then be tracked relative to a calibration position and/or orientation. Calibration data may then be used for stitching together the at least a portion of a scene captured by each lens into a composite image.

Continuing with FIG. 6C, a position and/or orientation of a lens array and/or each lens in the lens array may be adjusted 670. For example, based on a user input from user interface 160, the position and/or orientation of the lens array 115 and/or a lens 125-1, 125-2, . . . , 125-N in the lens array 115 may be adjusted 670. In this manner, the at least a portion of a scene captured by each lens 125-1, 125-2, . . . , 125-N may be changed.

Figure 7:
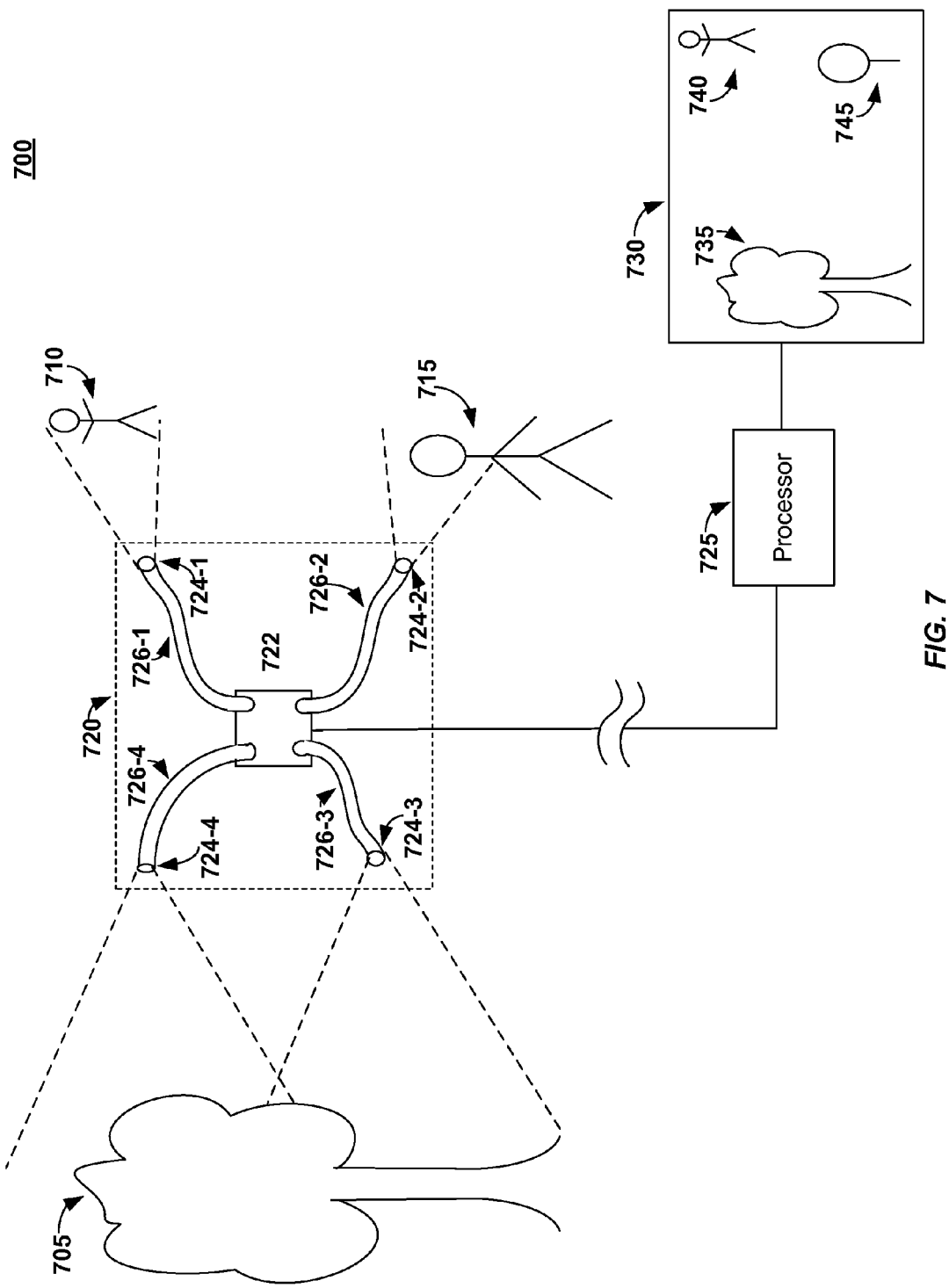
FIG. 7 depicts a sketch of a vision system illustrating image capture and display consistent with the present disclosure.

Attention is directed to FIG. 7, depicting a sketch 700 of a scene including objects 705, 710, 715, an image sensing apparatus 720 including image sensor 722, lenses 724-1, 724-2, . . . , 724-4 and associated optical fiber bundles 726-1, 726-2, . . . , 724-4, a processor 725 and a composite image 730 corresponding to the scene including images 735, 740, 745 corresponding to objects 705, 710, 715, respectively. As described herein, each lens 724-1, 724-2, . . . , 724-4 has an associated field of view. The associated field of view of lens 724-1 includes object 710, the associated field of view of lens 724-2 includes a portion of object 715 and the associated fields of view of lenses 724-3 and 724-4 include overlapping portions of object 705. Optical image data corresponding to at least a portion of each object captured by the lenses may be transmitted to image sensor 722 by optical fiber bundles 726-1, . . . , 726-4. The optical fiber bundles 726-1, 726-2, . . . , 726-4 are coupled to a surface of the image sensor 722. Coupling areas of the surface of image sensor 722 associated with each optical fiber bundle are generally non-overlapping. The image sensor 722 is configured to convert the optical image data from each optical fiber bundle 726-1, 726-2, . . . , 726-4 into electrical image data and to provide the electrical image data to processor 725. Processor 725 is configured to process the received electrical image data and to generate the composite image 730 for display. The composite image 730 may include the image 740 of object 710, the portion 745 of the object 715 and the image 735 of object 705. The image 735 of object 705 may result from compositing electrical image data corresponding to the optical image data from lenses 724-3 and 724-4. The composite image 730 may be generated based on the captured optical image data and/or position and/or orientation data for each lens 724-1, 724-2, . . . , 724-4.

Figure 8:
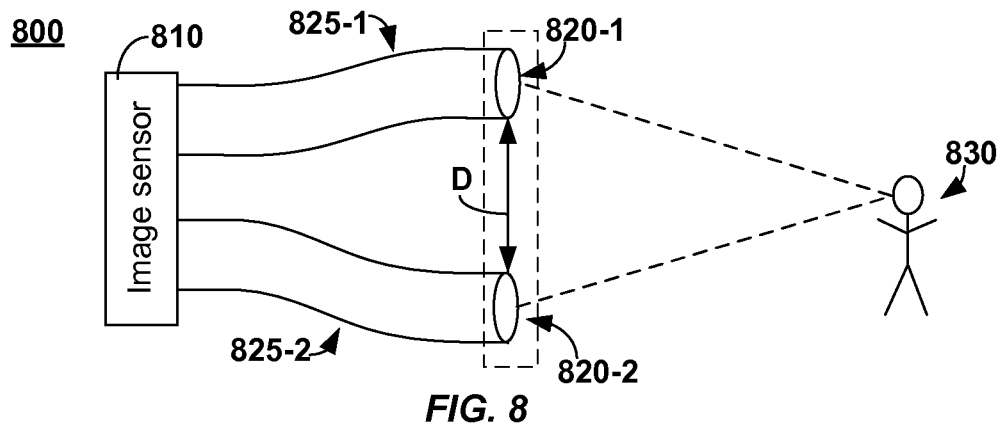
FIG. 8 depicts a sketch of a vision apparatus configured for binocular vision.

Attention is directed to FIG. 8, depicting a sketch 800 of a vision apparatus configured for binocular vision. The apparatus may include an image sensor 810 coupled to two lenses 820-1, 820-2 by respective optical fiber bundles 825-1, 825-2. The lenses 820-1, 820-2 may be positioned a separation distance, D, from each other. The two lenses 820-1, 820-2 and separation distance D may be configured to provide binocular vision, e.g., allowing determination of a distance from lenses 820-1, 820-2 to an object 830.

Accordingly, a vision system, apparatus and/or method, consistent with the present disclosure is configured to capture at least a portion of a scene using a plurality of lenses coupled to an image sensor by a plurality of optical fiber bundles and to generate an output. The output may include a composite display of the captured at least a portion of a scene for a user.

Figure 9:
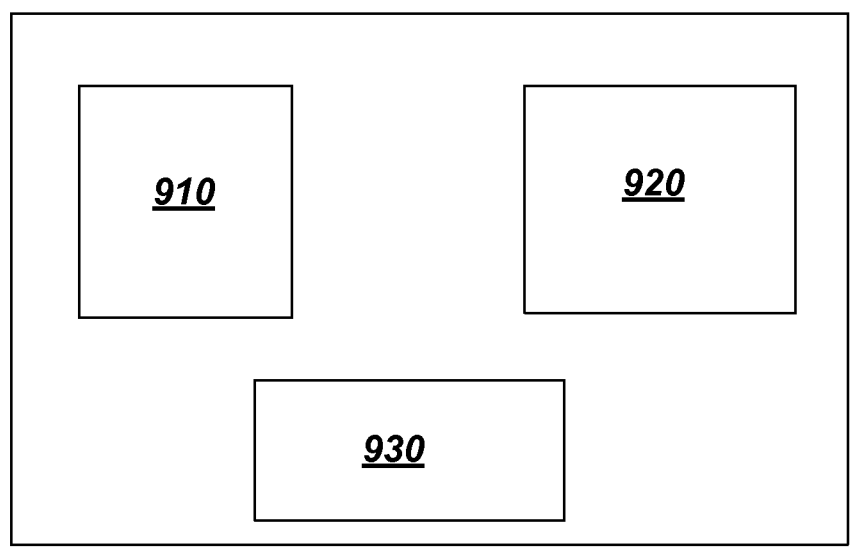
FIG. 9 illustrates an example of a vision system that contains a processor, machine readable media and a user interface.

It should also be appreciated that the functionality described herein for the embodiments of the present invention may be implemented by using hardware, software, or a combination of hardware and software, as desired. If implemented by software, a processor and a machine readable medium are required. The processor may be any type of processor capable of providing the speed and functionality required by the embodiments of the invention. Machine-readable memory includes any media capable of storing instructions adapted to be executed by a processor. Some examples of such memory include, but are not limited to, read-only memory (ROM), random-access memory (RAM), programmable ROM (PROM), erasable programmable ROM (EPROM), electronically erasable programmable ROM (EEPROM), dynamic RAM (DRAM), magnetic disk (e.g., floppy disk and hard drive), optical disk (e.g. CD-ROM), and any other device that can store digital information. The instructions may be stored on a medium in either a compressed and/or encrypted format. Accordingly, in the broad context of the present invention, and with attention to FIG. 9, vision system may include a processor (910) and machine readable media (920) and user interface (930).

Although illustrative embodiments and methods have been shown and described, a wide range of modifications, changes, and substitutions is contemplated in the foregoing disclosure and in some instances some features of the embodiments or steps of the method may be employed without a corresponding use of other features or steps. Accordingly, it is appropriate that the claims be construed broadly and in a manner consistent with the scope of the embodiments disclosed herein.

What is claimed is:

1. A vision apparatus comprising:
a plurality of lenses, each of said plurality of lenses configured to capture at least a portion of a scene, and wherein a first lens of said plurality of lenses is oriented at an angle that differs from an orientation of a second lens of said plurality of lenses;
a lens orientation controller configured to sense said orientation of said first lens relative to said orientation of said second lens and to adjust said orientation of said first lens in response to input from a user interface;
a plurality of optical fiber bundles, each of said plurality of optical fiber bundles having a first end and a second end, each said first end coupled to one of said plurality of lenses; and
an image sensor coupled to said second end of said plurality of optical fiber bundles, wherein each of said plurality of optical fiber bundles is configured to transmit optical image data corresponding to each said at least a portion of a scene from each said lens to said image sensor and said image sensor is configured to convert said optical image data into corresponding electrical image data; and
wherein said coupling of said second end to said image sensor is configured to preserve an orientation of said second end relative to a surface of said image sensor during said adjustment of said orientation of said first lens.

2. The apparatus of claim 1 wherein said plurality of lenses are each capable of being separately positioned and/or jointly positioned.

3. The apparatus of claim 1 wherein said plurality of lenses comprises between 2 and 100 lenses.

4. The apparatus of claim 1 wherein said plurality of lenses have an angle of view of 10 degrees to 75 degrees.

5. The apparatus of claim 1 wherein said fiber bundles have a length of between 1.27 cm and 3.05 meters.

6. The apparatus of claim 1 wherein said image sensor comprises a plurality of pixels and each of said fiber bundles comprise a plurality of fibers, where the plurality of fibers in a bundle correspond to a sub-set of said plurality of pixels in the image sensor.

7. The apparatus of claim 6 wherein the correspondence between the plurality of fibers to said sub-set of pixels comprises the value of 1:2 to 2:1.

8. A system comprising:
a plurality of lenses, each of said plurality of lenses configured to capture at least a portion of a scene, and wherein a first lens of said plurality of lenses is oriented at an angle that differs from an orientation of a second lens of said plurality of lenses;
a plurality of optical fiber bundles, each of said plurality of optical fiber bundles having a first end and a second end, each said first end coupled to one of said plurality of lenses;
an image sensor coupled to said second end of said plurality of optical fiber bundles, wherein each of said plurality of optical fiber bundles is configured to transmit optical image data corresponding to each said at least a portion of a scene from each said lens to said image sensor and said image sensor is configured to convert said optical image data into corresponding electrical image data;
a processor coupled to said image sensor, said processor configured to process said electrical image data and to generate an output based on said electrical image data; and
a lens orientation controller configured to sense said orientation of said first lens relative to said orientation of said second lens and to adjust said orientation of said first lens under control of said processor, wherein said coupling of said second end to said image sensor is configured to preserve an orientation of said second end relative to a surface of said image sensor during said adjustment of said orientation of said first lens.

9. The system of claim 8 wherein said plurality of lenses are each capable of being separately positioned and/or jointly positioned.

10. The system of claim 8 wherein said plurality of lenses comprises between 2 and 100 lenses.

11. The system of claim 8 wherein said plurality of lenses have an angle of view of 10 degrees to 75 degrees.

12. The system of claim 8 wherein said fiber bundles have a length of between 1.27 cm and 3.05 meters.

13. The system of claim 8 wherein said image sensor comprises a plurality of pixels and each of said fiber bundles comprise a plurality of fibers, where the plurality of fibers in a bundle correspond to a sub-set of said plurality of pixels in the image sensor.

14. The system of claim 13 wherein the correspondence between the plurality of fibers to said sub-set of pixels comprises the value of 1:2 to 2:1.

15. A method for vision comprising:
capturing optical image data representing at least a portion of a scene using a plurality of lenses coupled to a plurality of optical fiber bundles, wherein a first lens of said plurality of lenses is oriented at an angle that differs from an orientation of a second lens of said plurality of lenses;
sensing said orientation of said first lens relative to said orientation of said second lens;
adjusting said orientation of said first lens in response to input from a user interface;
transmitting said optical image data to an image sensor using said plurality of optical fiber bundles, said plurality of optical fiber bundles coupled to said image sensor, wherein said coupling of said plurality of optical fibers to said image sensor is configured to preserve an orientation of said plurality of optical fibers relative to a surface of said image sensor during said adjustment of said orientation of said first lens; and
converting said optical image data into electrical image data using said image sensor, said electrical image data corresponding to said optical image data.

16. The method of claim 15 further comprising:
providing said electrical image data to a processor; and
processing said electrical image data using said processor; and
generating an output based on said processed electrical image data.

17. The method of claim 15 wherein said plurality of lenses are each capable of being separately positioned and/or jointly positioned.

18. The method of claim 15 wherein said plurality of lenses comprises between 2 and 100 lenses.

19. The method of claim 15 wherein said plurality of lenses have an angle of view of 10 degrees to 75 degrees.

20. The method of claim 15 wherein said fiber bundles have a length of between 1.27 cm and 3.05 meters.

21. The method of claim 15 wherein said image sensor comprises a plurality of pixels and each of said fiber bundles comprise a plurality of fibers, where the plurality of fibers in a bundle correspond to a sub-set of said plurality of pixels in the image sensor.

22. The method of claim 21 wherein the correspondence between the plurality of fibers to said sub-set of pixels comprises the value of 1:2 to 2:1.

23. An article comprising a storage medium having stored thereon instructions that when executed by a machine result in the following operations:
capturing optical image data representing at least a portion of a scene using a plurality of lenses coupled to a plurality of optical fiber bundles, wherein a first lens of said plurality of lenses is oriented at an angle that differs from an orientation of a second lens of said plurality of lenses;
sensing said orientation of said first lens relative to said orientation of said second lens;
adjusting said orientation of said first lens in response to input from a user interface;
transmitting said optical image data to an image sensor using said plurality of optical fiber bundles, said plurality of optical fiber bundles coupled to said image sensor, wherein said coupling of said plurality of optical fibers to said image sensor is configured to preserve an orientation of said plurality of optical fibers relative to a surface of said image sensor during said adjustment of said orientation of said first lens;
converting said optical image data into electrical image data using said image sensor, said electrical image data corresponding to said optical image data.

24. The article of claim 23 wherein said instructions further result in the following operations:
providing said electrical image data to a processor; and
processing said electrical image data using said processor; and
generating an output based on said processed electrical image data.

25. The article of claim 23 wherein said plurality of lenses are each capable of being separately positioned and/or jointly positioned.

26. The article of claim 23 wherein said plurality of lenses comprises between 2 and 100 lenses.

27. The article of claim 23 wherein said plurality of lenses have an angle of view of 10 degrees to 75 degrees.

28. The article of claim 23 wherein said fiber bundles have a length of between 1.27 cm and 3.05 meters.

29. The article of claim 23 wherein said image sensor comprises a plurality of pixels and each of said fiber bundles comprise a plurality of fibers, where the plurality of fibers in a bundle correspond to a sub-set of said plurality of pixels in the image sensor.

30. The article of claim 29 wherein the correspondence between the plurality of fibers to said sub-set of pixels comprises the value of 1:2 to 2:1.

* * * * *